United States Patent Office 2,895,961
Patented July 21, 1959

2,895,961

COMPOUNDS CONTAINING THE IMIDAZOLINE AND IMIDAZOLIDONE OR IMIDAZOLIDINETHIONE GROUPS

William B. Hughes, Webster Groves, Mo., assignor to Cities Service Research and Development Company, New York, N.Y., a corporation of New Jersey No Drawing. Application March 14, 1956
Serial No. 571,375

11 Claims. (Cl. 260—309.6)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, tanks and other storage equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion in wells producing oil-brine, and particularly reducing corrosion in wells in which large amounts of brine are produced as compared to oil.

I have discovered that if tetraethylene pentamine is reacted with urea or thiourea to provide an intermediate imidazolidone or intermediate imidazolidinethione, and this product is further reacted with a second mol of urea or thiourea, a mol of a monocarboxylic acid or a mol of an aldehyde, the new compounds formed possess unexpectedly superior corrosion-inhibiting properties. The result of reacting the intermediate imidazolidone or imidazolidinethione with a mol of urea or thiourea provides on the aminoethyl side chain of the intermediate product an imidazolidone or imidazolidinethione ring. When the intermediate imidazolidone or imidazolidinethione product is reacted with a mol of a monocarboxylic acid, an imidazoline ring will be provided on the aminoethyl side chain of the intermediate product if water is removed from the reaction mixture, or an acid salt of the intermediate imidazolidone or imidazolidinethione if water is not removed from the reaction mixture. Further, if the intermediate imidazoldione or imidazolidinethione reaction product of the pentamineurea (thiourea) reaction is reacted with an aldehyde, the aminoethyl side chain of the intermediate product will contain an imidazolidine ring. In all cases, the various substituents are obtained by reacting the terminal amine group of the side chain of the intermediate imidazolidione or imidazolidinethione reaction product with the urea, acid or aldehyde compounds hereafter described.

The structure of the new compounds which I have found to possess most effective corrosion inhibiting properties is as follows:

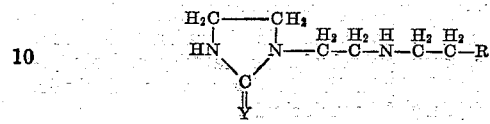

wherein Y is oxygen or sulphur, depending on whether urea or thiourea is used in forming the intermediate imidazoline or imidazolidinethione ring structure, and R is a substituted imidazolidone, a substituted imidazoline, an acid salt of the intermediate imidazolidone or a substituted imidazolodine substituent.

In preparing compounds of this type, equimolar amounts of urea or thiourea and an aqueous solution of tetraethylene pentamine are first reacted, with water and ammonia being removed from the reaction zone by distillation. The reaction product, ethylaminoethylimidazolidone or ethylaminoethylimidazolidenethione, hereafter referred to as the intermediate reaction product, is then further reacted with another mol of urea or thiourea, an acid or an aldehyde to provide the imidazolidone, or imidazolidinethione imidazoline, acid salt or imidazolidine desired. In order to prepare the di-imidazolidone or the di-imidazolidine thiones—the terminal amine group of the intermediate reaction product side chain, that is, the side chain of the ethylaminoethylimidazolidone or ethylaminoethylimidazolidenethione is reacted with a mol of urea (or thiourea) under conditions in which one mol of water is removed from the reaction zone to yield a final di-imidazolidone or di-imidazolidinethione product.

In preparing the imidazolidone - imidazolines or the imidazolidinethione-imidazolines, the terminal amine group of the intermediate imidazolidone side chain is reacted with 1 mol of a monocarboxylic acid, with 2 mols of water being removed from the reaction mixture to provide the imidazoline ring structure on the imidazolidone side chain. In preparing these compounds, I have found that any aliphatic or aromatic monocarboxylic acid having from about 2 to about 20 carbon atoms can be used. If an aliphatic acid is used, it may be saturated or unsaturated, having a branched or straight chain and may include such substituents as hydroxyl groups or other substituents. Among the acids which I have found to be particularly effective in preparing the imidazolidone - imidazoline compounds of this invention are acetic, propionic, butyric, valeric, caproic, heptoic, octanoic, monoic, lauric, myristic, palmitic, stearic, oleic, linoleic, benzoic, ricinoleic, and terephthalic. In addition, I have found that under certain circumstances, the lower molecular weight monocarboxylic acids can be satisfactorily used.

In obtaining the acid salts of the intermediate compounds, which are also effective corrosion inhibitors, the water is not removed from the reaction mixture, that is to say, if the intermediate reaction product and the added monocarboxylic acid are not heated so as to remove water from the reaction zone, an acid salt will be obtained. It is understood, of course, that acid salts can be obtained in this manner with any of the previously mentioned monocarboxylic acids.

In preparing the imidazolidone-imidazolidine compounds or the imidazolidinethione-imidazolidine compounds, the intermediate product, obtained by reacting the tetraethylene pentamine and urea or thiourea, is further reacted with a molar amount of a selected aldehyde with 1 mol of water being removed to form the imidazolidine ring on the terminal amine group of the intermediate product. In preparing the imidazolidone-imidazolidine compounds or the companion sulphur compound, I have found that any aldehyde compound of from about 1 to about 15 carbon atoms can be utilized. The aldehyde selected may be unsaturated though the saturated aldehydes are preferred. In addition, the selected aldehyde may have some branching in the molecular chain. Specifically, I have found the following aldehydes most satisfactory in providing effective imidazolidone-imidazolidine or imidazolidinethione-imidazolidine compounds: formaldehyde (paraformaldehyde), acetaldehyde, propionaldehyde, butyraldehyde, isobutyraldehyde, veleraldehyde, isoveleraldehyde, heptaldehyde, ethylhexaldehyde and benzaldehyde.

In order to more thoroughly understand the nature of the compounds of my invention, specific examples are hereafter provided. In the examples, proof of the basic ring structure has not been repeated. The preparation of the ethylaminoethylimidazolidone or ethylaminoethylimidazolidenethione, which is utilized as the intermediate reaction product to formulate the compounds of my invention, is carried out according to the reaction described by C. E. Sweitzer, Journal of Organic Chemistry, 15, 471–474 (1950). In the method described by Sweitzer, equimolar quantities of urea and a 68 weight percent aqueous solution of tetraethylene pentamine are mixed with the mixture being allowed to reflux so that water and ammonia, which is liberated in the reaction, can be removed from the reaction zone. Water removal is effected by azeotropic distillation utilizing an azeotrope forming solvent such as benzene, toluene or the like with the initial water removal being carried out in a range of from about 80 to 140° C. At the end of a 4–5 hour heating period, all of the water and ammonia will generally have been removed. The temperature of the reaction mixture is then slowly increased to about 250° C. to insure complete removal of water and ammonia, after which the reaction mixture is allowed to cool. The product in the case of ethylaminoethylimidazolidone is a yellow viscous liquid. The product had a molecular weight determined according to the method of Rast (Ber., 55–1051, 3727; 1922) of 143. The theoretical molecular weight for this compound is 145. The structure of this material was further confirmed by a qualitative test for the imidazolidone structure. This test is based on the work of Morgan and Burstall, Journal Chemical Society, 1928, 143–55, in which it is shown that groups with 2 $NH_2$ groups and a thiocarbonyl group or a carbonyl group give complex materials of the type (Cu 2 $tu$) $NO_3H_2O$, (Cu 5 $tu$) $NO_3.1$ or $2H_2$), or (Cu 11 $tu$) $NO_38H_2O_4$ where $tu$ is the heterocyclic ring compound when reacted with copper nitrate in acidic media. When a sample of the compounds containing an imidazolidone structure is added to a 10 percent copper nitrate solution, which has been acidified with hydrochloric acid, a colorless, gelatinous material forms, which is specific for the 5 membered ring with a double bonded sulphur or oxygen attached.

The preparation of the intermediate imidazolidine thione compound or specifically the ethylaminoethylimidazolidine thione is carried out in the same manner as that described above by the substitution of thiourea for normal urea. Reaction conditions remain the same and the product is substantially similar in all respects with a deeper yellow color and having sulphur substituted for oxygen on the normal imidazolidone ring.

In order to more fully and completely understand this invention and more particularly the manner in which the improved compositions thereof are obtained, the following specific examples are provided.

EXAMPLE 1

Using the method described by Sweitzer, an equimolar quantity (1 mol) of urea and tetraethylene pentamine were mixed. The pentamine was used as a 68 weight percent aqueous solution. The mixture was allowed to reflux while water was slowly removed by azeotropic distillation utilizing toluene as the azeotrope forming solvent. During the removal of water, distillation was conducted at a temperature of about 110° C. with the ammonia liberated during the reaction by allowing to escape. At the end of a five hour heating period all of the water had been removed and the reaction mixture was slowly increased in temperature to about 250° C. and maintained at this temperature for about 5 minutes. The reaction product, ethylaminoethylimidazolidone, was a viscous liquid, yellowish in color and had a molecular weight of 143.

This compound was tested as a corrosion inhibitor and can be identified as inhibitor No. 1 in Table 1, which follows.

EXAMPLE 2

Following the procedure outlined in Example 1, 1 mol of the reaction product of Example 1 was further reacted with 1 mol (60 grams) of urea in a similar manner to produce the di-imidazolidone compound, identified as inhibitor No. 2 in Table 1, which follows.

EXAMPLE 3

The following procedure outlined in Example 1; equimolar quantities of thiourea and tetraethylene pentamine were reacted with the pentamine being used as a 69 percent aqueous solution. The mixture was allowed to reflux while water was slowly being removed and liberated ammonia allowed to escape. At the end of a 5 hour heating period, substantially all of the water present in the reaction mixture had been removed. The reaction mixture was heated to a temperature of about 250° C. to insure complete removal of water and liberated ammonia. The product was then cooled and a molecular weight determination on the same made according to the method of Rast, yielding a molecular weight of 245. A small portion of this compound was tested according to the Morgan and Burstall method and determined to have the imidazolidinethione ring structure. This product is identified as inhibitor No. 3 in Table 1, which follows.

EXAMPLE 4

The mol of the reaction product of Example 3 was reacted with an additional mol (76.2 grams) of thiourea to provide a similar reaction product of di-imidazolidine thione. This product is identified as inhibitor No. 4 in Table 1, which follows.

The effectiveness of the new compounds of my invention described above, and those which are hereinafter described, in reducing and effectively inhibitng corrosion may be more fully understood by reference to certain tests which I have conducted. These tests utilized prepared brines to substantially duplicate corrosion conditions met in oil field operations. This test hereafter described is generally referred to as the static test since no movement of test strips is made after the test strip has been immersed in the brine. This is to be contrasted with the dynamic test described in my copending application Ser. No. 552,264, filed December 12, 1955, wherein the test strip is continuously dipped in the corrosive brine over a fixed period of time.

The test procedure used herein involved a measurement of the corrosive action of a hypothetical well fluid as inhibited with compositions described above upon weighed, cleaned, and polished strips of number 18 gauge, cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosion inhibitor being tested was added to each flask in amounts ranging from 10 to 50 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100 = \text{percent protection}$$

in which L1 is the loss in weight of strips taken from uninhibited test fluids, and L2 is the loss in weight of strips which were subjected to inhibited test fluids.

Following the test procedure outlined above, the compounds prepared according to Examples 1, 2, 3 and 4 were tested as corrosion inhibitors. The results of these tests are recorded in Table I, which follows. It will be noted that a comparison is made of the intermediate product as prepared according to Examples 1 and 3 and the final product as prepared in Examples 2 and 4 at the varying concentrations indicated. The tests run on the materials prepared according to Examples 2 and 4 clearly illustrate the superiority of my new corrosion inhibiting compounds over the intermediate reaction products as well as the tetraethylene pentamine compounds itself.

It is to be further noted that hereinafter all corrosion inhibiting test results in the tables which follow were obtained on the basis of the previously desccribed test.

Table I

| Inhibitor No. | Reactants | | Molar ratio | Percent protection | |
|---|---|---|---|---|---|
| | | | | 25 p.p.m. | 50 p.p.m. |
| 1 | TEPA[1] | Urea | 1:1 | 43.8 | 62.1 |
| 2 | TEPA | do | 1:2 | 77.3 | 92.1 |
| 3 | TEPA | Thiourea | 1:1 | 45.6 | 65.5 |
| 4 | TEPA | do | 1:2 | 89.9 | 98.9 |
| 5 | TEPA | | | 18.2 | 23.8 |

[1] Tetraethylene pentamine.

EXAMPLE 5

Following the procedure of Example 1 and the tests previously described, 1 mol (213 grams) of the imidazolidone intermediate product prepared from tetraethylene pentamine and urea was mixed with 1 mol (280 grams) of oleic acid. To this mixture 100 ml. of toluene was added. The reaction mixture was charged to a distillation flask equipped with a reflux condenser and a decanter still head. The mixture was heated to boiling with the toluene water azeotrope being removed. Water was removed in the decanter still head with the toluene being continuously returned to the reaction mixture through the reflux condenser. At the end of a 6 hour reaction period 37.9 grams of water had been removed. This amount of water is substantially the theoretical quantity which could be removed in the 1:1 molar reaction of a complex amine with the carboxyl group of an acid to form an imidazoline ring. The resulting product was dark brown in color, semi-solid and had a determined molecular weight of 456. This product has a theoretical molecular weight value of 457. The product was completely soluble in oil and dispersible in water. The product is identified as corrosion inhibitor No. 1 in Table II, which follows.

EXAMPLE 6

Following the procedure set forth above in Example 5 and the method outlined in Example 1 previously, 1 mol of acetic acid was reacted with 1 mol of the intermediate reaction product, ethylaminoethylimidazolidone, described in Example 1 to provide a light yellow viscous syrup, which was soluble in water and had a determined molecular weight of 210 contrasted to a theoretical molecular weight for this product of 216. This final reaction product is identified as inhibitor No. 2 in Table II, which follows.

EXAMPLE 7

According to the method of preparation described in Examples 1 and 5, 1 mol of the intermediate reaction product was reacted with 1 mol of palmitic acid to produce an oil soluble, water dispersible, semi-solid product with a theoretical molecular weight of 480, and a determined molecular weight of 488. This product is identified as corrosion inhibitor No. 4 in Table II following.

EXAMPLE 8

Following the procedure of Examples 1 and 5, 120 grams of benzoic acid was reacted with 1 mol of the intermediate imidazolidone product prepared according to Example 1. After removal of 2 mols of water by azeotropic distillation, a pale yellow water soluble product was obtained. This final reaction product had a determined molecular weight of 296 contrasted with an expected theoretical molecular weight of 299. This product was tested as a corrosion inhibitor and is identified as inhibitor No. 5 in Table II.

EXAMPLE 9

According to the procedure set forth in Example 5, 1 mol of butyric acid was reacted with 1 mol of the intermediate imidazolidone product described in Example 1.

Upon removal of water by azeotropic distillation a reaction product was obtained having a determined molecular weight of 308. This product was brown in color and readily soluble in oil. Tests on this product are recorded for inhibitor No. 3 in the table which follows.

Table II

| Inhibitor No. | Formulation | | | Mol ratio | Percent protection | | |
|---|---|---|---|---|---|---|---|
| | | | | | 10 p.p.m. | 25 p.p.m. | 50 p.p.m. |
| 1 | TEPA | Urea | Oleic acid | 1:1:1 | 86.4 | 92.3 | 97.4 |
| 2 | TEPA | do | Acetic acid | 1:1:1 | 19.8 | 37.6 | 84.2 |
| 3 | TEPA | do | Butyric acid | 1:1:1 | 85.4 | 91.8 | 96.2 |
| 4 | TEPA | do | Palmitic acid | 1:1:1 | 86.8 | 93.0 | 98.1 |
| 5 | TEPA | do | Benzoic acid | 1:1:1 | 87.3 | 94.4 | 98.3 |

EXAMPLE 10

According to the method described in Example 1, an imidazolidine thione was prepared as described in Example 3. 1 mol of this intermediate product was then reacted with 1 mol (280 grams) of oleic acid with the elimination of 2 mols of water to leave a light brown liquid which was oil soluble and had a determined molecular weight of 470. The theoretical molecular weight value for this compound was 471. The compound is identified as inhibitor No. 1 in Table III which follows.

EXAMPLE 11

Following the procedure of Example 3, the intermediate imidazolidine thione product was prepared and one mol of the same reacted with 122 grams (1 mol) of benzoic acid to provide the final imidazolidine thione-imidazoline reaction product by removing 2 mols of water from the reaction mixture. This product was a light yellow syrup, soluble in oil, dispersible in water, and had a molecular weight of 309 as compared to the theoretical value of 313. This product was tested as a corrosion inhibitor and is identified as inhibitor No. 2 in Table III.

EXAMPLE 12

1 mol of the product of Example 3 was reacted with 1 mol of palmitic acid, with 2 mols of water being removed from the reaction mixture and a yellowish liquid being recovered, having a molecular weight of 400. This product is identified as inhibitor No. 3 in Table III which follows.

EXAMPLE 13

Similar to Example 12, an imidazolidine thione-imidazoline was prepared by reacting 1 mol of acetic acid (60 grams) with 263 grams of the intermediate imidazolidine thione reaction product of Example 2 to provide a final reaction product identified as inhibitor No. 4 in Table III, following.

EXAMPLE 14

One mol of the product of Example 3 was reacted with 1 mol of butyric acid, with 2 mols of water being removed from the reaction mixture to provide a final imidazolidine thione-imidazoline reaction product identified as inhibitor No. 5 in the following Table III.

EXAMPLE 15

An intermediate product as prepared according to Example 1, was reacted with an equimolar quantity of oleic acid. On addition of the acid a spontaneous reaction occurred with the liberation of heat. No water was removed from the solution as in the formation of imidazolidone ring described in Examples 10 through 14 and 5 through 9, so that an acid salt was obtained, identified as such by a brown color and having a paste-like consistency. This product is identified as inhibitor No. 1 in Table IV.

EXAMPLE 16

In a similar manner, to Example 15, the imidazolidone intermediate product of Example 1 was reacted with 2 mols of oleic acid to yield a final reaction product, the oleic acid salt of ethylaminoethylimidazolidone, identified as inhibitor No. 2 in Table IV.

EXAMPLE 17

In a similar manner and according to the reaction described in Examples 15 and 16 previously, 1 mol of the product of Example 1 was reacted with 4 mols of oleic acid to provide a brown oil soluble paste, identified as inhibitor No. 4 in Table IV.

EXAMPLE 18

Following the procedure set forth in the foregoing Examples 1 and 15, oleic acid was reacted with the reaction product of tetraethylene pentamine and urea in the ratio of 3 mols of acid to 1 mol of the imidazolidone intermediate product to provide a final corrosion inhibiting compound identified as inhibitor No. 3 in Table IV.

As an indication of the effectiveness of the acid salts of imidazolidone, Table IV which follows includes in a comparison with the acid salts, a corrosion inhibiting test conducted with the product of Example 1 alone, that is, the ethylaminoethylimidazolidone, identified as inhibitor No. 5 and unreacted tetraethylene pentamine, identified as inhibitor No. 6. It will be noted that in all cases the acid salts provided far superior protection against corrosion than did the inhibitors 5 and 6. It is also of interest to note in regard to Table IV, that the products prepared with a higher mol ratio of acid generally did not provide as satisfactory protection as the 1:1:1 reaction product of TEPA, urea and oleic acid.

Table III

| Inhibitor No. | Composition | | | Mol ratio | Percent protection | | |
|---|---|---|---|---|---|---|---|
| | | | | | 10 p.p.m. | 25 p.p.m. | 50 p.p.m. |
| 1 | TEPA | Thiourea | Oleic acid | 1:1:1 | 91.0 | 98.2 | 97.4 |
| 2 | TEPA | do | Benzoic acid | 1:1:1 | 92.7 | 98.3 | 98.1 |
| 3 | TEPA | do | Palmitic acid | 1:1:1 | 93.0 | 98.6 | 99.0 |
| 4 | TEPA | do | Acetic acid | 1:1:1 | 27.9 | 61.9 | 88.9 |
| 5 | TEPA | do | Butyric acid | 1:1:1 | 88.1 | 92.3 | 97.6 |

Table IV

| Inhibitor No. | Composition | | | Mol ratio | Percent protection | |
|---|---|---|---|---|---|---|
| | | | | | 25 p.p.m. | 50 p.p.m. |
| 1 | TEPA | Urea | Oleic acid | 1:1:1 | 93.8 | 99.3 |
| 2 | TEPA | do | do | 1:1:2 | 94.0 | 96.7 |
| 3 | TEPA | do | do | 1:1:3 | 90.3 | 94.8 |
| 4 | TEPA | do | do | 1:1:4 | 88.6 | 90.8 |
| 5 | TEPA | do | | 1:1 | 43.8 | 62.1 |
| 6 | TEPA | | | | 16.2 | 23.8 |

EXAMPLE 19

Utilizing 1 mol of the intermediate reaction product prepared according to Example 3, a corrosion inhibitor of the oleic acid, imidazoline thione salt was prepared. This was accomplished by reacting equimolar amounts of the imidazolidine thione and oleic acid under conditions permitting the liberation of heat spontaneously generated on the addition of acid to the imidazolidine thione. No attempt was made to remove water to obtain a ring closure as was done in Examples 5–14. The product an acid salt, identified as inhibitor No. 1 in Table V, which follows is an oil soluble, brown, semi-solid at room temperature and had a determined molecular weight of 527, as compared to the theoretical molecular weight value of 525.

EXAMPLE 20

Following the procedure set forth in Example 3 and Example 19 above, 2 mols of oleic acid were reacted with 1 mol of the product of Example 3 to provide a corrosion inhibiting composition, identified and tested as inhibitor No. 2 in Table V, which follows. This product was a light brown, oil soluble paste.

EXAMPLE 21

As described in Example 20, above, 3 mols of oleic acid were reacted with 1 mol of the reaction product of Example 3 to provide a final composition identified as inhibitor No. 3 in Table V, which follows.

EXAMPLE 22

In a like manner to that described in Examples 19 and 20 above, 4 mols of oleic acid were reacted with the imidazolidine thione of Example 1 (1 mol) to provide a final reaction product, which is identified as inhibitor No. 4 in Table V following.

In order to more fully evaluate the effectiveness of the inhibitors of the foregoing Examples 19, 20, 21 and 22, comparative tests are provided in Table V for the product of Example 3, that is, the TEPA thiourea product, when tested as a corrosion inhibitor without the added acid to form an acid salt. It will be noted that both at 25 and 50 p.p.m. the imidazolidine thione is in no way comparable in providing protection under the same conditions that the other inhibitors were tested.

EXAMPLE 23

According to the method described in Example 1, the intermediate ethylaminoethylimidazolidone was prepared and reacted with an equimolar amount of formaldehyde with the removal of 1 mol of water by azeotropic distillation to produce an imidazolidone-imidazolidine compound, which was water soluble and had a determined molecular weight of 341 for this reaction product. The product was tested as a corrosion inhibitor and is identified as inhibitor No. 1 in Table VI, which follows.

EXAMPLE 24

Following the procedure outlined in Example 23, a similar product was prepared using butyraldehyde in place of formaldehyde. To obtain the reaction product, the intermediate imidazolidone prepared according to the method described in Example 1 was reacted with an equimolar amount of butyraldehyde in the presence of a xylene solvent to facilitate removal of water as an azeotrope. After recovery of approximately 1 mol of water, indicating formation of the imidazolidine ring on the side chain of the imidazolidone product, the temperature of the mixture was increased to remove water therefrom, leaving a light brown semi-solid material having a molecular weight of 394 according to the method of Rast. The theoretical molecular weight for this imidazolidone-imidazolidine product is 399. This compound is identified as corrosion inhibitor No. 2 in Table VI.

EXAMPLE 25

Following the procedure outlined in Example 23, equimolar amounts of heptaldehyde and the intermediate imidazolidone product were reacted under conditions to produce an imidazolidone-imidazolidine product, which was oil soluble, semi-solid in character, and brownish in color. According to the method of Rast, the product had a molecular weight of 380 as compared to a theoretical molecular weight value of 382. The final reaction product was obtained by removing 1 mol of water from the reaction mixture by azeotropic distillation to the imidazolidine ring on the side chain of the intermediate product of Example 1. This product was tested as a corrosion inhibitor and is identified as inhibitor No. 3 in the following table.

EXAMPLE 26

Following the method of Example 23 and Example 1, benzaldehyde was reacted with the intermediate product of Example 1, i.e. ethylaminoethylimidazolidone, to produce a yellow syrup, soluble in oil, dispersible in water, and having a molecular weight of 229. This product was obtained by azeotropic distillation, in which 1 mol of water was recovered from the reaction mixture. The product, tested as a corrosion inhibitor, provided the protection indicated by inhibitor No. 4 in Table VI.

Table VI

| Inhibitor No. | Composition | | | Mol ratio | Percent protection | | |
|---|---|---|---|---|---|---|---|
| | | | | | 10 p.p.m. | 25 p.p.m. | 50 p.p.m. |
| 1 | TEPA | Urea | HCHO | 1:1:1 | 31.4 | 81.4 | 90.2 |
| 2 | TEPA | do | Butyraldehyde | 1:1:1 | 78.4 | 96.8 | 97.8 |
| 3 | TEPA | do | Heptaldehyde | 1:1:1 | 82.7 | 97.7 | 98.9 |
| 4 | TEPA | do | Benzaldehyde | 1:1:1 | 89.9 | 97.3 | 99.0 |

Table V

| Inhibitor No. | Composition | | | Mol ratio | Percent protection | |
|---|---|---|---|---|---|---|
| | | | | | 25 p.p.m. | 50 p.p.m. |
| 1 | TEPA | Thiourea | Oleic acid | 1:1:1 | 91.8 | 95.4 |
| 2 | TEPA | do | do | 1:1:2 | 93.0 | 97.0 |
| 3 | TEPA | do | do | 1:1:3 | 92.2 | 97.1 |
| 4 | TEPA | do | do | 1:1:4 | 90.8 | 96.1 |
| 5 | TEPA | do | | 1:1 | 45.6 | 68.5 |

EXAMPLE 27

According to the method described in Example 3, ethylaminoethylimidazolidine thione was prepared by reacting equimolar quantities of tetraethylene pentamine and thiourea. 1 mol of the product obtained was further reacted with 1 mol of formaldehyde (30.3 grams of paraformaldehyde). Water was removed as a toluene-water azeotrope until approximately 18 grams (1 mol) of water had been recovered indicating the formation of the imidazolidine ring. The imidazolidine thione-imidazolidine product was a yellow syrup, water soluble, dispersible in oil, and had a molecular weight of 353. This product was tested as a corrosion inhibitor and is identified as inhibitor No. 1 in Table VII.

EXAMPLE 28

Following the method of preparation described in Example 27 above, 1 mol of butyraldehyde (72 grams) was reacted with 1 mol of the intermediate product obtained according to the method described in Example 3. A final product was obtained by removal of 1 mol of water from the reaction mixture by azeotropic distillation using toluene as the azeotrope forming solvent. Distillation was carried out at a temperature of between about 80° C. and 110° C. with the reaction mixture being heated to a temperature of approximately 250° C. The final reaction product was a brown, oil soluble syrup and is identified as inhibitor No. 2 in the following Table VII.

EXAMPLE 29

According to the method described in Example 27, 114 grams (1 mol) of heptaldehyde was reacted with 245 grams of the intermediate reaction product prepared according to the method of Example 3. After recovery of water indicating formation of the imidazolidine ring, a reaction product was recovered having a dark brown color and a determined molecular weight of 260. The theoretical molecular weight for this imidazolidine-imidazolidinethione is 263. This product, tested as a corrosion inhibitor, provided the extremely high degree of protection indicated for inhibitor No. 3 in Table VII.

EXAMPLE 30

Following the procedure of Example 29, 106 grams (1 mol) of benzaldehyde was reacted with 245 grams (1 mol) of the intermediate product prepared according to Example 3. After recovery of 1 mol of water, a clear yellow syrup was obtained, which was found to be oil soluble and water dispersible. The final reaction product had a molecular weight of 334, which is to be compared with the theoretical value for this final product of 333. This corrosion inhibitor, identified as inhibitor No. 4, provided the protection indicated in Table No. VII.

In using my improved compositions for protecting the piping, casings, and other equipment which comes in contact with the corrosive fluids, I have found that excellent results may be obtained by injecting an appropriate quantity, generally not more than 1500 p.p.m. and preferably not more than 200 p.p.m., of the selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the substituted imidazolidone or substituted imidazolidinethione compounds of this invention preferentially wet the surface of the metal equipment with oil, thus excluding the brine from contact with the metal. In any event, however, despite the lack of a complete understanding of the mechanics of the inhibiting effect, the new structures of my invention are extremely and surprisingly effective in protecting oil well and oil field equipment from corrosion, even when used in amounts of 50 p.p.m. or less, based on the oil content of the well fluid.

It is to be understood that the improved compositions of my invention are not limited to use alone or singly and may be applied along with other agents commonly introduced in the producing oil wells for breaking emulsions, preventing scale formation, minimizing pitting, etc. It is further evident that my invention is not restricted to the use of improved compositions for inhibiting corrosion in oil wells, but may be employed to perform this function in the presence of corrosive fluids derived from many other sources.

I claim:

1. As a new composition of matter a compound having the formula

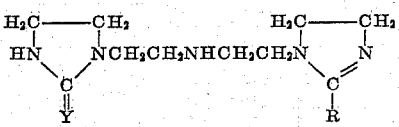

wherein Y is selected from the group consisting of oxygen and sulfur and R is selected from the group of hydrocarbon radicals consisting of alkyl and alkenyl radicals having not more than 20 carbon atoms and the phenyl radical.

2. A compound as claimed in claim 1, wherein Y is oxygen and R is $C_{17}H_{33}$.
3. A compound as claimed in claim 1, wherein Y is oxygen and R is $CH_3$.
4. A compound as claimed in claim 1, wherein Y is oxygen and R is $C_3H_7$.
5. A compound as claimed in claim 1, wherein Y is oxygen and R is $C_{15}H_{31}$.
6. A compound as claimed in claim 1, wherein Y is oxygen and R is $C_6H_5$.
7. A compound as claimed in claim 1, wherein Y is sulfur and R is $C_{17}H_{33}$.
8. A compound as claimed in claim 1, wherein Y is sulfur and R is $C_6H_5$.

*Table VII*

| Inhibitor No. | Composition | | | Mol ratio | Percent protection | | |
|---|---|---|---|---|---|---|---|
| | | | | | 10 p.p.m. | 25 p.p.m. | 50 p.p.m. |
| 1 | TEPA | Thiourea | HCHO | 1:1:1 | 32.0 | 80.0 | 93.2 |
| 2 | TEPA | do | Butyraldehyde | 1:1:1 | 89.6 | 90.1 | 97.2 |
| 3 | TEPA | do | Heptaldehyde | 1:1:1 | 91.7 | 99.1 | 99.3 |
| 4 | TEPA | do | Benzaldehyde | 1:1:1 | 94.6 | 99.8 | 98.4 |

9. A compound as claimed in claim 1, wherein Y is sulfur and R is $C_{15}H_{31}$.
10. A compound as claimed in claim 1, wherein Y is sulfur and R is $CH_3$.
11. A compound as claimed in claim 1, wherein Y is sulfur and R is $C_3H_7$.

References Cited in the file of this patent

UNITED STATES PATENTS

| | | |
|---|---|---|
| 2,468,163 | Blair et al. | Apr. 26, 1949 |
| 2,520,102 | Tyron | Aug. 22, 1950 |
| 2,613,212 | Hurwitz et al. | Oct. 7, 1952 |
| 2,646,399 | Hughes | July 21, 1953 |
| 2,713,582 | Smith | July 19, 1955 |
| 2,770,628 | Bortnick et al. | Nov. 13, 1956 |
| 2,787,619 | Yost | Apr. 2, 1957 |

OTHER REFERENCES

Lecher et al.: Chem. Abstracts, vol. 48, col. 3256 (1954).

UNITED STATES PATENT OFFICE

CERTIFICATE OF CORRECTION

Patent No. 2,895,961                                          July 21, 1959

William B. Hughes

It is hereby certified that error appears in the printed specification of the above numbered patent requiring correction and that the said Letters Patent should read as corrected below.

Column 1, line 68, for "intermediate imidazoldione or" read -- intermediate imidazolidone or --; column 2, line 2, for "the intermediate imidazolidione or" read -- the intermediate imidazolidone or --; column 4, line 28, for "The following" read -- Following the --; column 9, line 15, for "imidazoline thione salt" read -- imidazolidine thione salt --.

Signed and sealed this 23rd day of February 1960.

(SEAL)

Attest:

KARL H. AXLINE                                                  ROBERT C. WATSON
Attesting Officer                                               Commissioner of Patents